US012032387B2

(12) United States Patent
Oda et al.

(10) Patent No.: US 12,032,387 B2
(45) Date of Patent: Jul. 9, 2024

(54) AUTONOMOUS MOBILE ROBOT, AUTONOMOUS MOBILE METHOD, AND STORAGE MEDIUM

(71) Applicant: TOYOTA JIDOSHA KABUSHIKI KAISHA, Toyota (JP)

(72) Inventors: Shiro Oda, Anjo (JP); Tetsuya Taira, Nagakute (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP); Kyosuke Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 339 days.

(21) Appl. No.: 17/516,891

(22) Filed: Nov. 2, 2021

(65) Prior Publication Data
US 2022/0236742 A1 Jul. 28, 2022

(30) Foreign Application Priority Data
Jan. 28, 2021 (JP) ................................. 2021-011827

(51) Int. Cl.
*G05D 1/00* (2024.01)
*G06Q 10/083* (2024.01)

(52) U.S. Cl.
CPC ......... *G05D 1/0297* (2013.01); *G06Q 10/083* (2013.01)

(58) Field of Classification Search
None
See application file for complete search history.

(56) References Cited

U.S. PATENT DOCUMENTS

| 6,895,301 | B2 * | 5/2005 | Mountz | ................ | G05D 1/0297 |
| | | | | | 700/215 |
| 7,402,018 | B2 * | 7/2008 | Mountz | ................. | B60D 1/465 |
| | | | | | 280/47.35 |
| 7,826,919 | B2 * | 11/2010 | D'Andrea | ............ | G05D 1/0234 |
| | | | | | 700/214 |

(Continued)

FOREIGN PATENT DOCUMENTS

| CN | 110998620 A | * | 4/2020 | .............. B25J 13/00 |
| CN | 110998620 A | | 4/2020 | |

(Continued)

OTHER PUBLICATIONS

English Translation for JP-2010134581-A (Year: 2010).*
English Translation for ES-2827192-T3 (Year: 2021).*

*Primary Examiner* — Thomas E Worden
(74) *Attorney, Agent, or Firm* — Dickinson Wright, PLLC

(57) ABSTRACT

An autonomous mobile system according to the present embodiment includes an autonomous mobile robot that autonomously moves in a facility. Among priorities assigned to a plurality of the autonomous mobile robots for delivery of a transported object at a destination or passage through a waypoint in the facility, when the autonomous mobile robot has a lower priority, the autonomous mobile robot stands by in a predetermined standby area until another autonomous mobile robot having a higher priority completes the delivery or the passage.

13 Claims, 10 Drawing Sheets

(56) References Cited

U.S. PATENT DOCUMENTS

| | | | | |
|---|---|---|---|---|
| 7,850,413 B2 * | 12/2010 | Fontana | ............... | B66F 3/08 414/331.14 |
| 7,873,469 B2 * | 1/2011 | D'Andrea | ............ | G05D 1/0246 701/410 |
| 7,894,933 B2 * | 2/2011 | Mountz | ............... | G06Q 10/087 700/214 |
| 8,311,902 B2 * | 11/2012 | Mountz | ............. | G06Q 10/0875 700/226 |
| 8,412,400 B2 * | 4/2013 | D'Andrea | ............ | G05D 1/0212 701/28 |
| 8,444,369 B2 * | 5/2013 | Watt | ..................... | B65G 37/02 414/809 |
| 8,538,692 B2 * | 9/2013 | Wurman | ................. | G05D 3/00 700/214 |
| 8,606,392 B2 * | 12/2013 | Wurman | ........ | G05B 19/41895 700/214 |
| 9,008,827 B1 * | 4/2015 | Dwarakanath | ........ | F25B 27/00 700/214 |
| 2004/0093116 A1 * | 5/2004 | Mountz | ................ | G05D 1/0297 700/216 |
| 2006/0020366 A1 * | 1/2006 | Bloom | ................ | G06Q 20/00 700/226 |
| 2007/0288123 A1 * | 12/2007 | D'Andrea | ............ | G05D 1/0234 700/214 |
| 2007/0294029 A1 * | 12/2007 | D'Andrea | ............ | G05D 1/0246 701/410 |
| 2008/0166217 A1 * | 7/2008 | Fontana | ................ | B66F 9/063 414/800 |
| 2008/0167884 A1 * | 7/2008 | Mountz | ............ | G06Q 10/0833 705/29 |
| 2011/0015779 A1 * | 1/2011 | D'Andrea | ............. | G05D 1/021 700/214 |
| 2011/0060449 A1 * | 3/2011 | Wurman | ............... | C07C 253/34 700/218 |
| 2011/0103924 A1 * | 5/2011 | Watt | ....................... | B65G 49/00 414/800 |
| 2011/0112758 A1 * | 5/2011 | D'Andrea | ............ | G05D 1/0246 701/414 |
| 2011/0130866 A1 * | 6/2011 | D'Andrea | ............ | G05D 1/0234 700/214 |
| 2013/0054005 A1 * | 2/2013 | Stevens | ................ | G06Q 10/087 700/216 |
| 2013/0302132 A1 * | 11/2013 | D'Andrea | ............ | G05D 1/0274 414/807 |
| 2017/0282368 A1 * | 10/2017 | Johnson | .................. | B25J 9/1666 |
| 2018/0043533 A1 * | 2/2018 | Johnson | .................. | B25J 9/1666 |
| 2019/0018427 A1 * | 1/2019 | Jeon | ...................... | G05D 1/0214 |
| 2022/0202266 A1 * | 6/2022 | Oda | ..................... | A47L 11/4011 |
| 2023/0052077 A1 * | 2/2023 | Maeda | ................. | G05D 1/0291 |

FOREIGN PATENT DOCUMENTS

| | | | | |
|---|---|---|---|---|
| ES | 2827192 T3 | * | 5/2021 | ............ G05D 1/0274 |
| JP | H05119835 A | | 5/1993 | |
| JP | H10177415 A | | 6/1998 | |
| JP | 2010134581 A | * | 6/2010 | |
| JP | 2012234461 A | | 11/2012 | |
| JP | 5332561 B2 | | 11/2013 | |
| JP | 5332561 B2 | * | 11/2013 | |
| JP | 2018163415 A | | 10/2018 | |
| JP | 2019202160 A | | 11/2019 | |
| JP | 2020524848 A | | 8/2020 | |
| WO | WO-2006044108 A2 | * | 4/2006 | ............. B60D 1/465 |
| WO | WO-2007011814 A2 | * | 1/2007 | ............. G06Q 10/08 |
| WO | WO-2007149703 A2 | * | 12/2007 | ........... G05D 1/0297 |
| WO | WO-2007149711 A2 | * | 12/2007 | ....... G05B 19/41895 |
| WO | WO-2013119942 A1 | * | 8/2013 | ........... G05D 1/0274 |
| WO | 2018/237105 A1 | | 12/2018 | |
| WO | WO-2018237105 A1 | * | 12/2018 | .............. B25J 13/00 |

* cited by examiner

FIG. 4
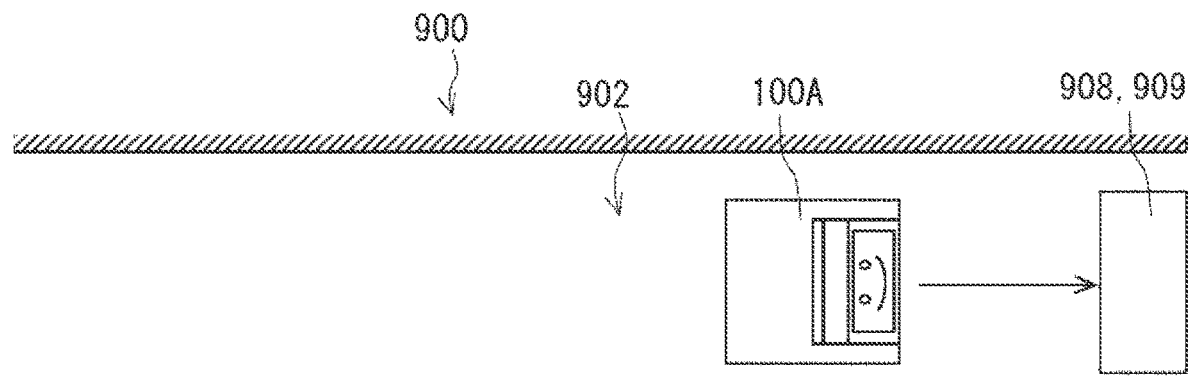
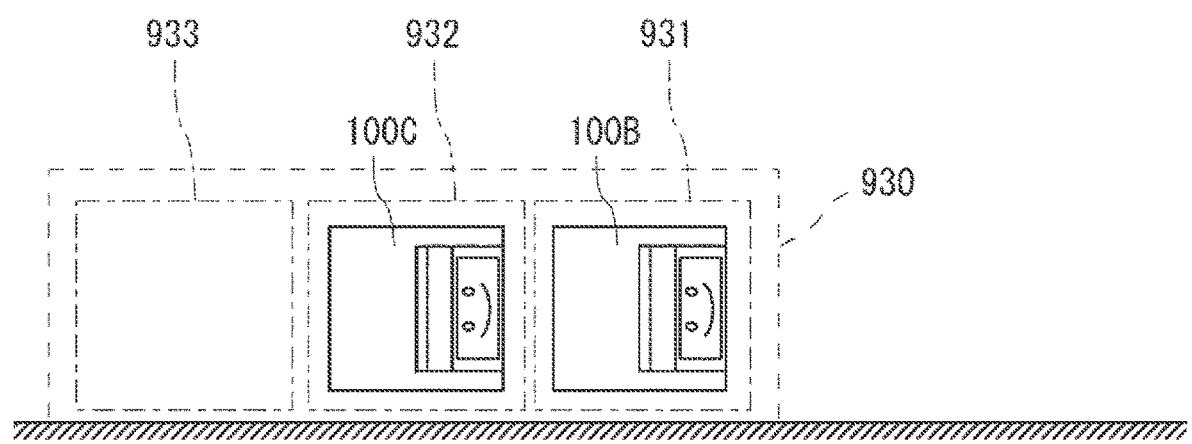
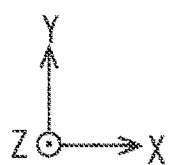

FIG. 6
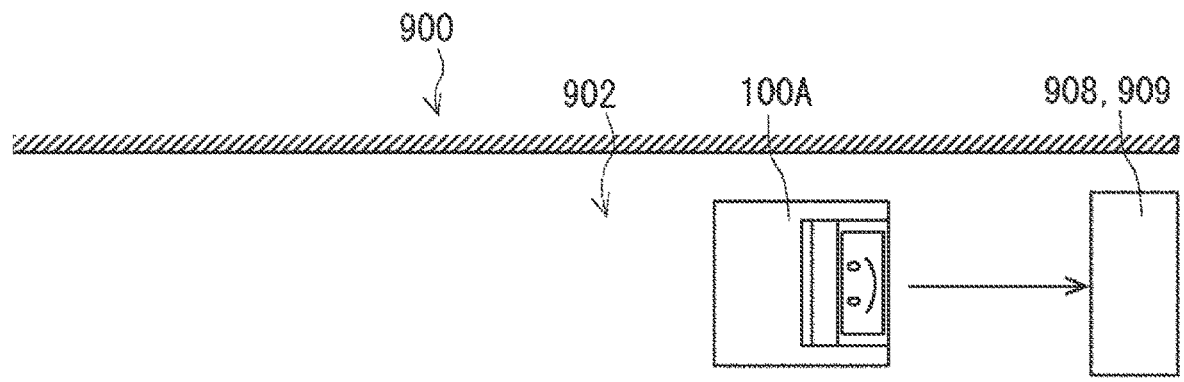
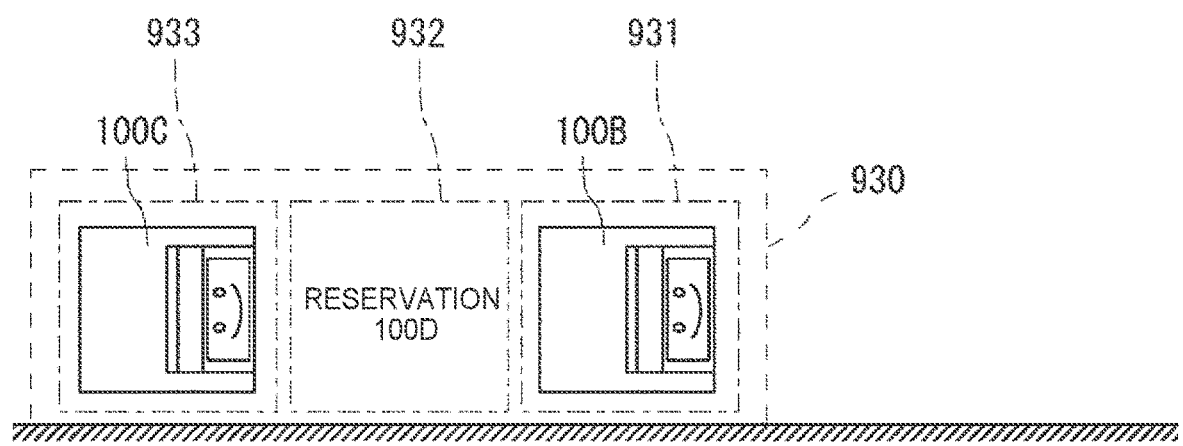

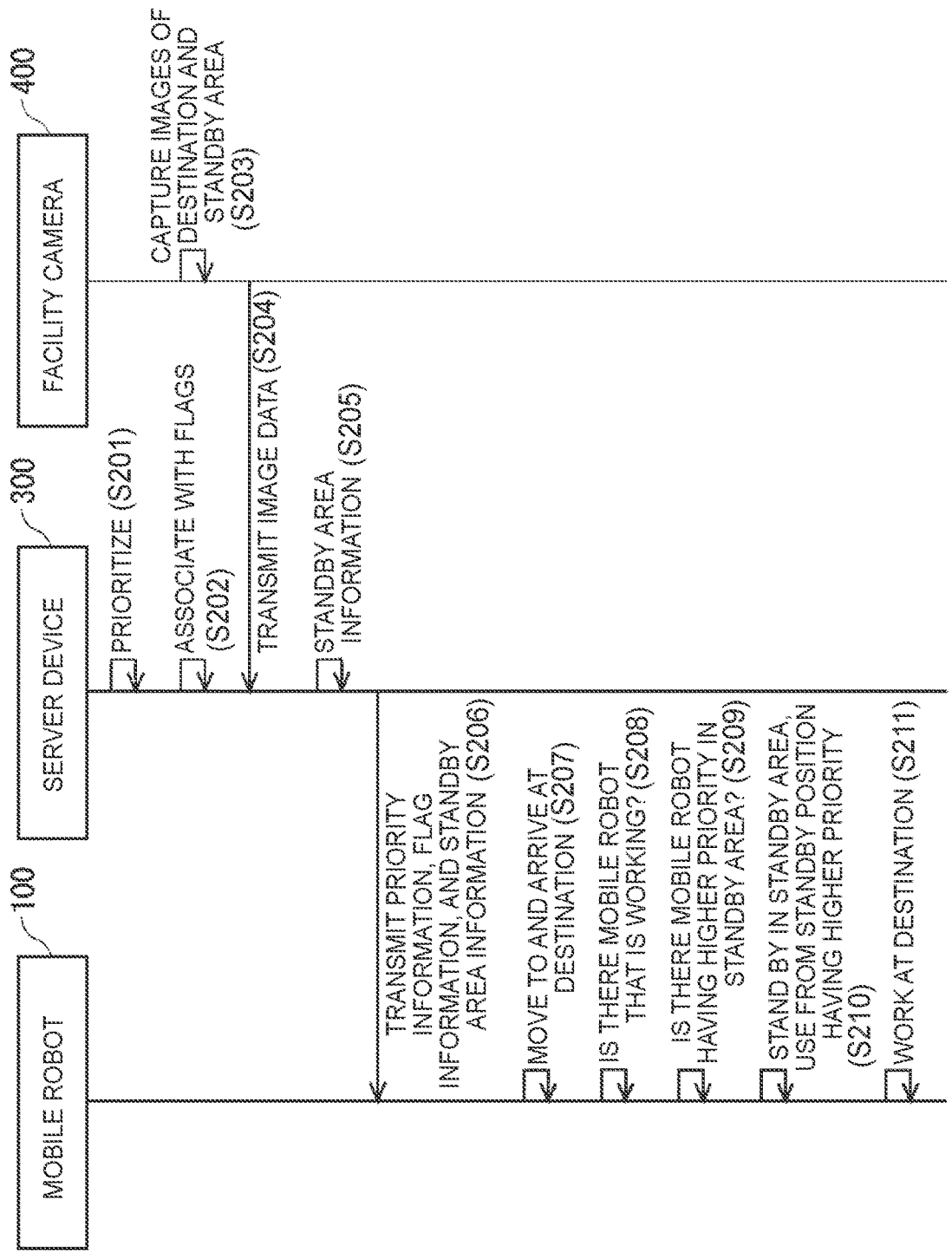

AUTONOMOUS MOBILE ROBOT, AUTONOMOUS MOBILE METHOD, AND STORAGE MEDIUM

CROSS-REFERENCE TO RELATED APPLICATION

This application claims priority to Japanese Patent Application No. 2021-011827 filed on Jan. 28, 2021, incorporated herein by reference in its entirety.

BACKGROUND

1. Technical Field

The present disclosure relates to an autonomous mobile system, an autonomous mobile method, and a storage medium.

2. Description of Related Art

Development of autonomous mobile devices that autonomously move within a predetermined building or facility is in progress. Such an autonomous mobile device having a loading platform can serve as an automatic delivery device that automatically delivers a package. The automatic delivery device can, for example, deliver the package loaded at the departure point to the destination by autonomously moving from the departure point to the destination.

For example, Japanese Patent No. 5332561 (JP 5332561 B) describes that when a plurality of robots is about to merge at a confluence such as an intersection, the robot having a lower priority is made to stand by and the robot having a higher priority is made to travel first.

SUMMARY

For example, in the robots of JP 5332561 B, when the succeeding robot has a higher priority than the preceding robot, it may be difficult to create an efficient delivery schedule. For example, in FIG. 8(a) of JP 5332561 B, when the delivery order is higher in the order of F, A, and B, there is no place where A can be temporarily evacuated, making it difficult to create an efficient delivery schedule.

The present disclosure has been made to solve the issue described above, and provides an autonomous mobile system, an autonomous mobile method, and a storage medium capable of improving movement efficiency.

An autonomous mobile system according to the present embodiment is an autonomous mobile system that autonomously moves in a facility. Among priorities assigned to a plurality of the autonomous mobile systems for delivery at a destination or passage through a waypoint in the facility, when the autonomous mobile system has a lower priority, the autonomous mobile system stands by in a predetermined standby area until another autonomous mobile system having a higher priority completes the delivery or the passage. With such a configuration, even when the succeeding autonomous mobile system has a higher priority, the preceding autonomous mobile system can be temporarily put on standby in the standby area, so that an efficient delivery schedule can be created. Therefore, the movement efficiency can be improved.

In the above autonomous mobile system, the standby area may have a plurality of standby positions prioritized according to a distance from the destination or the waypoint, and may be used for standby from the standby position having a higher priority. With such a configuration, the autonomous mobile system on standby can shorten the time for moving from the standby area to the destination or the waypoint when the turn comes, and an efficient delivery schedule can be created.

In the above autonomous mobile system, when the autonomous mobile system has a higher priority than another autonomous mobile system standing by in the standby area, the autonomous mobile system may reserve, when moving toward the standby area, the standby position having a higher priority than the standby position at which the other autonomous mobile system stands by. With such a configuration, it is possible to stand by at the standby position immediately after arriving at the standby area, so that the standby time can be shortened.

In the above autonomous mobile system, when the autonomous mobile system has a higher priority than another autonomous mobile system standing by in the standby area, the autonomous mobile system may cut into, when arriving at the standby area, the standby position having a higher priority than the standby position at which the other autonomous mobile system stands by. With such a configuration, it is possible to stand by at the standby position according to the priority, so that the movement efficiency can be improved.

In the above autonomous mobile system, when standing by at the standby position having the highest priority, the autonomous mobile system may notify an administrator of the autonomous mobile system of standby information including the standby information of the autonomous mobile system standing by at the standby position other than the standby position having the highest priority. With such a configuration, the administrator can grasp the standby status.

In the above autonomous mobile system, the autonomous mobile systems may include the autonomous mobile system associated with a cleanliness flag or an uncleanliness flag, a plurality of the standby areas may be provided in the facility, the plurality of the standby areas may include the standby area associated with the cleanliness flag or the uncleanliness flag, and when associated with the cleanliness flag, the autonomous mobile system may stand by at the standby position in the standby area associated with the cleanliness flag, and when associated with the uncleanliness flag, the autonomous mobile system may stand by at the standby position in the standby area associated with the uncleanliness flag. With such a configuration, the cleanliness of the autonomous mobile system and the standby area can be improved.

In the above autonomous mobile system, the standby area associated with a flag different from the cleanliness flag and the uncleanliness flag may be provided between the standby area associated with the cleanliness flag and the standby area associated with the uncleanliness flag. With such a configuration, the cleanliness of the standby area can be further improved.

An autonomous mobile system according to an embodiment includes: a plurality of autonomous mobile devices that moves autonomously in a facility; and a server device that transmits and receives traveling information to and from the autonomous mobile devices. The server device prioritizes each autonomous mobile device for delivery at a destination or passage through a waypoint in the facility. The autonomous mobile device having a lower priority stands by in a predetermined standby area until another autonomous mobile device having a higher priority completes the delivery or the passage. With such a configuration, even when the succeeding autonomous mobile system has a higher priority, the preceding autonomous mobile system can be temporarily put on standby in the standby area, so that an efficient delivery schedule can be created. Therefore, the movement efficiency can be improved.

In the above autonomous mobile system, the standby area may have a plurality of standby positions prioritized according to a distance from the destination or the waypoint, and may be used for standby from the standby position having a higher priority. With such a configuration, the autonomous mobile system on standby can shorten the time for moving from the standby area to the destination or the waypoint when the turn comes, and an efficient delivery schedule can be created.

In the above autonomous mobile system, when the autonomous mobile device having a higher priority than another autonomous mobile device standing by in the standby area moves toward the standby area, the server device may reserve the standby position having a higher priority than the standby position at which the other autonomous mobile device stands by. With such a configuration, it is possible to stand by at the standby position immediately after arriving at the standby area, so that the standby time can be shortened.

In the above autonomous mobile system, the autonomous mobile device having a higher priority than another autonomous mobile device standing by in the standby area may cut into, when arriving at the standby area, the standby position having a higher priority than the standby position at which the other autonomous mobile system stands by. With such a configuration, it is possible to stand by at the standby position according to the priority, so that the movement efficiency can be improved.

In the above autonomous mobile system, the server device may collectively notify an administrator of the autonomous mobile system of the standby information of the autonomous mobile devices standing by in the standby area. With such a configuration, the administrator can grasp the standby status.

In the above autonomous mobile system, the server device may associate the autonomous mobile device with a cleanliness flag or an uncleanliness flag, and may associate the standby area with the cleanliness flag or the uncleanliness flag. The autonomous mobile device associated with the cleanliness flag may stand by at the standby position in the standby area associated with the cleanliness flag. The autonomous mobile device associated with the uncleanliness flag may stand by at the standby position in the standby area associated with the uncleanliness flag. With such a configuration, the cleanliness of the autonomous mobile system and the standby area can be improved.

In the above autonomous mobile system, the standby area associated with a flag different from the cleanliness flag and the uncleanliness flag may be provided between the standby area associated with the cleanliness flag and the standby area associated with the uncleanliness flag. With such a configuration, the cleanliness of the standby area can be further improved.

An autonomous mobile method according to the present embodiment is an autonomous mobile method for an autonomous mobile device that autonomously moves in a facility. The autonomous mobile method includes: a step of assigning one of priorities to the autonomous mobile device among the priorities assigned to a plurality of the autonomous mobile devices for delivery at a destination or passage through a waypoint in the facility; and a step of causing, when the autonomous mobile device has a lower priority, the autonomous mobile device to stand by in a predetermined standby area until another autonomous mobile device having a higher priority completes the delivery or the passage. With such a configuration, even when the succeeding autonomous mobile device has a higher priority, the preceding autonomous mobile device can be temporarily put on standby in the standby area, so that an efficient delivery schedule can be created. Therefore, the movement efficiency can be improved.

A storage medium according to the present embodiment stores an autonomous mobile program for an autonomous mobile device that autonomously moves in a facility. The autonomous mobile program causes a computer to execute: assignment of one of priorities to the autonomous mobile device among the priorities assigned to a plurality of the autonomous mobile devices for delivery at a destination or passage through a waypoint in the facility; and standby of the autonomous mobile device, when the autonomous mobile device has a lower priority, in a predetermined standby area until another autonomous mobile system having a higher priority completes the delivery or the passage. With such a configuration, even when the succeeding autonomous mobile system has a higher priority, the preceding autonomous mobile system can be temporarily put on standby in the standby area, so that an efficient delivery schedule can be created. Therefore, the movement efficiency can be improved.

The present embodiment can provide an autonomous mobile system, an autonomous mobile method, and a storage medium capable of improving movement efficiency.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a plan view illustrating a movement method of the mobile robot in a facility according to the first embodiment;

FIG. 6 is a plan view illustrating a movement method of the mobile robot in the facility according to the first embodiment, and shows an example in which the mobile robot reserves a standby position when moving toward a standby area;

FIG. 10 is a sequence diagram illustrating the operation of an autonomous mobile system according to the second embodiment.

DETAILED DESCRIPTION OF EMBODIMENTS

Hereinafter, the present disclosure will be described through embodiments of the disclosure, but the disclosure is not limited to the following embodiments. Moreover, not all of the configurations described in the embodiments are indispensable as means for solving the problem. For the sake of clarity, the following description and drawings have been omitted and simplified as appropriate. In each drawing, the same elements are designated by the same reference signs, and duplicate descriptions are omitted as necessary.

First Embodiment

An autonomous mobile system according to a first embodiment will be described. In the present embodiment, the autonomous mobile system may be replaced with an autonomous mobile device, or the autonomous mobile device may be replaced with the autonomous mobile system. Further, the autonomous mobile system according to the present embodiment may include the autonomous mobile device. The autonomous mobile device autonomously moves in a predetermined facility. The autonomous mobile device may be, for example, a mobile robot that autonomously moves, or a transportation robot that autonomously moves to transport a transported object. Hereinafter, the mobile robot will be described as an example of the autonomous mobile device. The mobile robot will be described separately in "Structure of Mobile Robot" and "Operation of Mobile Robot".

Structure of Mobile Robot

Figure 1:
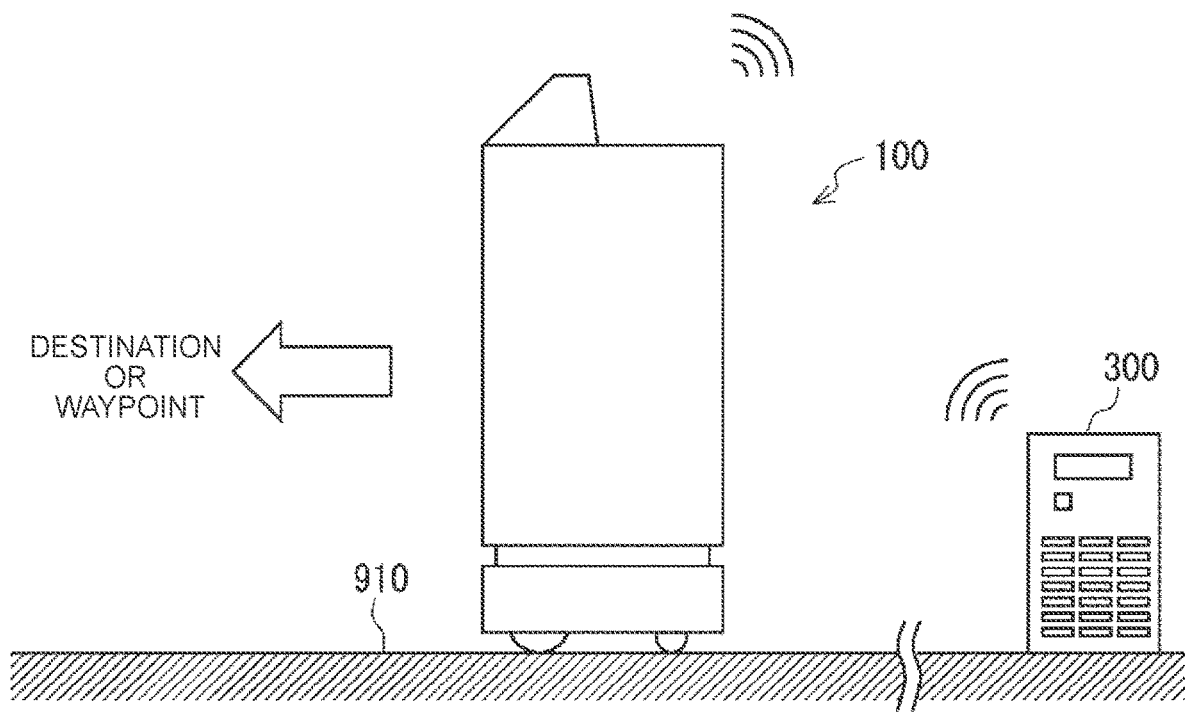
FIG. 1 is a schematic view illustrating a mobile robot according to a first embodiment.

FIG. 1 is a schematic view illustrating the mobile robot according to the first embodiment. As shown in FIG. 1, a mobile robot 100 is an example of the autonomous mobile device that autonomously moves in a predetermined facility 900. The predetermined facility 900 is, for example, a hospital. The predetermined facility 900 is not limited to a hospital, and may be a hotel, a shopping mall, or the like as long as the mobile robot 100 can move autonomously in the predetermined facility 900.

The mobile robot 100 autonomously moves on a floor surface 910 in the facility 900. A facility camera 400 is fixed in the facility 900. For example, the facility camera 400 is fixed to a ceiling 920 of the facility 900, and captures images of surrounding areas of the facility camera 400 to generate image data. A plurality of the facility cameras 400 may be provided in the facility 900.

The mobile robot 100 and the facility camera 400 are connected to each other so as to be able to communicate with each other via information transmission means such as wireless communication. The mobile robot 100 and the facility camera 400 may be connected to each other so as to be able to directly communicate with each other, or may be connected to each other so as to be able to communicate with each other via an access point 500 and a server device 300. Therefore, the mobile robot 100 may acquire the image data directly from the facility camera 400, or may acquire the image data via the access point 500 and the server device 300.

The access point 500 is, for example, a wireless local area network (LAN) access point. The access point 500 is fixed in the facility 900 and acquires position information and traveling information from the mobile robot 100 located in the periphery of the access point 500. A plurality of the access points 500 may be provided in the facility 900.

A plurality of the mobile robots 100 may autonomously move in the facility 900. When the mobile robots 100 autonomously move, the mobile robots 100 may be connected to each other so as to be able to communicate with each other via information transmission means such as wireless communication. The mobile robots 100 may be connected to each other so as to be able to directly communicate with each other, or may be connected to each other so as to be able to communicate with each other via the access point 500 and the server device 300.

The mobile robot 100 transports the transported object to the destination in the facility 900. Alternatively, the mobile robot 100 moves, for example, by passing through a waypoint in order to move to the destination. The plurality of mobile robots 100 may be prioritized for work such as delivery of a transported object at a destination or passage through a waypoint in the facility 900. When the mobile robot 100 has a lower priority, the mobile robot 100 stands by in a predetermined standby area until another mobile robot 100 having a higher priority completes the work at the destination or the passage through the waypoint.

The mobile robot 100 may be associated with a cleanliness flag, an uncleanliness flag, and a general-purpose flag according to the cleanliness of the transported object to be transported. The predetermined standby area may also be associated with a cleanliness flag, an uncleanliness flag, and a general-purpose flag according to the cleanliness.

The information transmitted and received between the mobile robot 100 and the server device 300 and the other mobile robots 100 may include priority information assigned to the work at the destination or passage through the waypoint, and flag information associated with the mobile robot 100 and the standby area.

Figure 2:
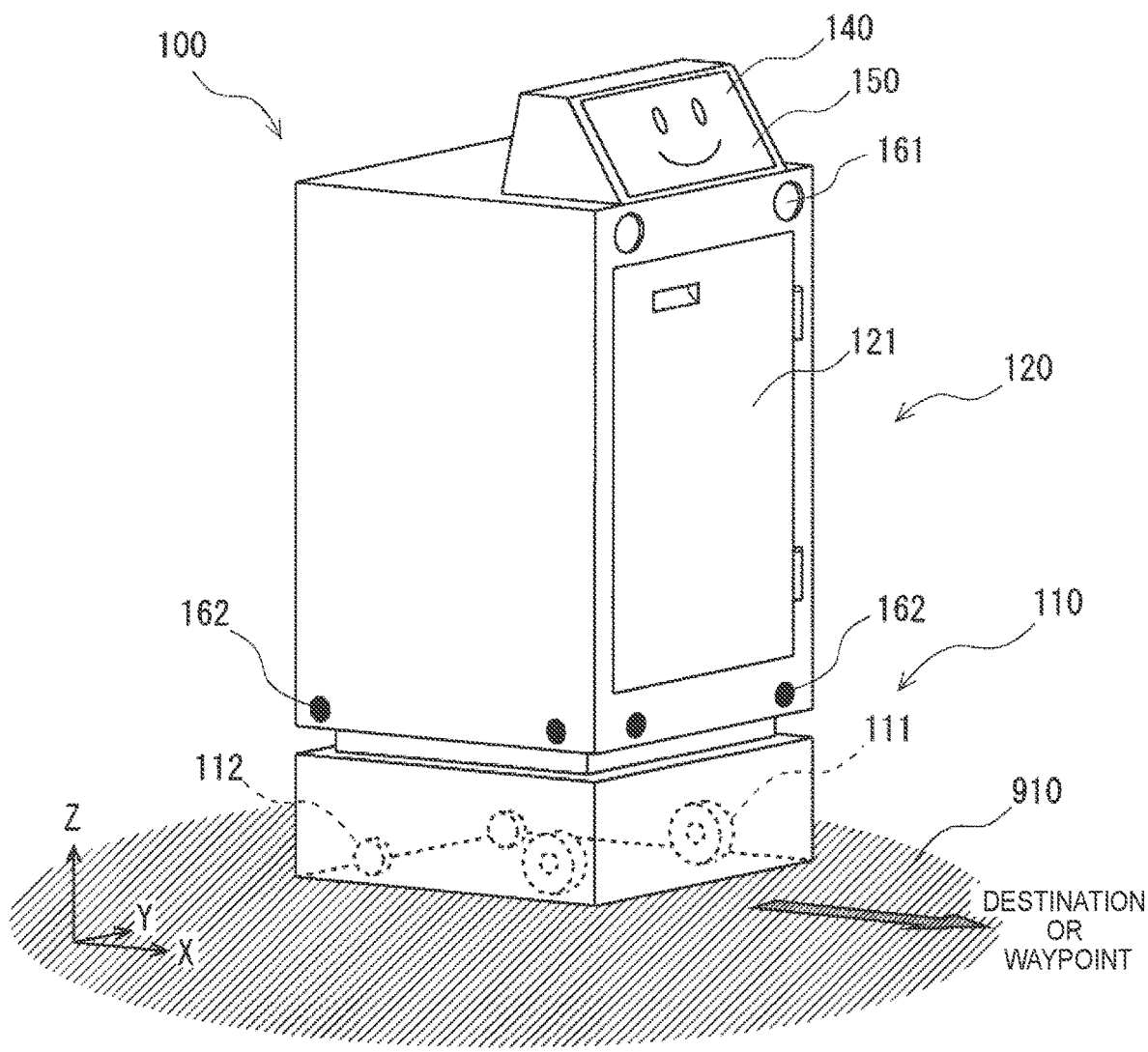
FIG. 2 is a perspective view illustrating the mobile robot according to the first embodiment.
Figure 3:
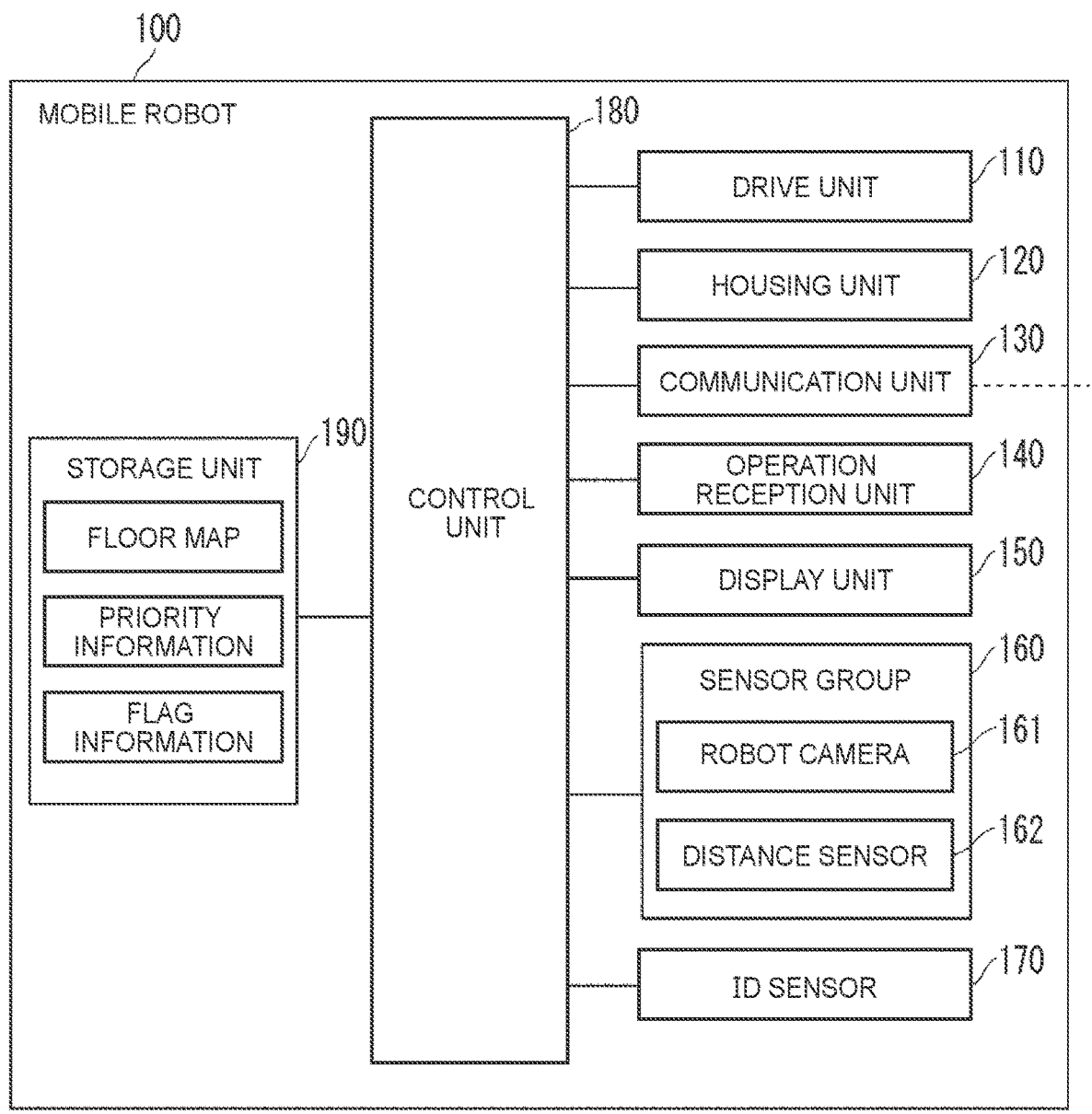
FIG. 3 is a block diagram illustrating the mobile robot according to the first embodiment.

FIG. 2 is a perspective view illustrating the mobile robot 100 according to the first embodiment. FIG. 3 is a block diagram illustrating the mobile robot 100 according to the first embodiment. As shown in FIGS. 2 and 3, the mobile robot 100 includes a drive unit 110, a housing unit 120, a communication unit 130, an operation reception unit 140, a display unit 150, a sensor group 160, an identification (ID) sensor 170, a control unit 180, and a storage unit 190.

As shown in FIG. 2, the mobile robot 100 is a mobile body that moves on the floor surface 910 that is a moving surface. Here, for convenience of explanation of the mobile robot 100, the XYZ orthogonal coordinate axis system is used. The floor surface 910 is the XY-plane, and the upper side is the +Z axis direction.

The drive unit 110 functions as means for moving the mobile robot 100. The drive unit 110 may include two drive wheels 111 that are in contact with the floor surface 910 and are rotatable independently from each other about one rotation axis that extends in a direction (right-left direction or Y-axis direction in the drawing) perpendicular to a straight direction (front-rear direction or X-axis direction in the drawing), and casters 112 in contact with the floor surface 910. The mobile robot 100 moves forward or rearward in a manner such that the drive wheels 111 disposed on the right and left sides are driven at the same rotation speed, and makes a turn by generating a difference in the rotation speed or rotation direction between the right and left drive wheels 111. The drive unit 110 drives the drive wheels 111 in accordance with commands from the control unit 180.

The housing unit 120 is disposed above the drive unit 110 of the mobile robot 100. The housing unit 120 may have a storage chamber door 121. When the storage chamber door 121 is opened, a storage chamber for storing a predetermined transported object is provided inside the housing unit 120. That is, the mobile robot 100 can also serve as a transportation robot that transports a predetermined transported object. The housing unit 120 may open and close the storage chamber door 121 in accordance with a command from the control unit 180.

As shown in FIG. 3, the communication unit 130 is an interface that is communicably connected to the outside. The communication unit 130 includes, for example, an antenna and a circuit that modulates or demodulates a signal transmitted through the antenna. The communication unit 130 receives the image data directly from the facility camera 400 or via the access point 500 and the server device 300.

Further, the communication unit 130 may receive information on the destination, information on whether movement is allowed, the priority information, and the flag information from the server device 300. Further, the communication unit 130 may transmit information related to the state of the mobile robot 100, the position information, the traveling information, the priority information, the flag information and the like to the server device 300. Further, the communication unit 130 may transmit and receive the position information, the image data, the priority information, and the flag information to and from the other mobile robot 100 directly or via the access point 500 and the server device 300.

The communication unit 130 may periodically transmit a heartbeat signal to the server device 300. The heartbeat signal may include log data indicating the state of the mobile robot 100 in the chronological order. Further, the heartbeat signal may include the ID of the mobile robot 100 and the ID of a user.

The communication unit 130 connects to the control unit 180, outputs, to the control unit 180, a signal transmitted from the facility camera 400 and the server device 300, and transmits, to the server device 300, the signal output from the control unit 180.

The operation reception unit 140 receives an input operation from the user and transmits an operation signal to the control unit 180. As means for receiving an input operation from the user, the operation reception unit 140 may include, for example, an operation button, a touch panel superimposed on the display unit 150, or the like. The user operates the input operation means described above to turn on and off the power supply, open and close the storage chamber door 121, and the like. In addition, the user may operate the operation reception unit 140 to input the flag information associated with the mobile robot 100 in accordance with the cleanliness of the transported objects stored in the storage chamber. For example, the user inputs the cleanliness flag, the uncleanliness flag, the general-purpose flag, and the like from the operation reception unit 140.

The display unit 150 is provided, for example, so as to project from the upper surface of the housing unit 120. The display unit 150 is, for example, a display unit including a rectangular liquid crystal panel. The display unit 150 appropriately displays information in accordance with the command from the control unit 180. A touch panel that receives operations from the user may be superimposed on the display unit 150. The display unit 150 may display the flag information associated with the mobile robot 100.

The sensor group 160 includes sensors that acquire data necessary for the mobile robot 100 to move autonomously. The sensor group 160 includes, for example, a robot camera 161 and a distance sensor 162. The sensor group 160 may include sensors other than the robot camera 161 and the distance sensor 162.

The robot camera 161 is disposed in an upper portion of the housing unit 120 and below the display unit 150, for example. In the robot camera 161, two camera units having the same angle of view may be disposed horizontally separated from each other. With this configuration, the images captured by each camera unit are output to the control unit 180 as the image data.

The distance sensor 162 is disposed, for example, in the lower portion of the housing unit 120. The distance sensor 162 may be disposed in the lower portion of each of a surface on the +X-axis direction side, a surface on the −X-axis direction side, a surface on the +Y-axis direction side, and a surface on the −Y-axis direction side of the housing unit 120. The distance sensor 162 measures the distance between an object around the mobile robot 100 and the mobile robot 100. The control unit 180 recognizes the obstacle around the mobile robot 100 by analyzing the image data output by the robot camera 161 and the detection signals output by the distance sensor 162, and measures the distance between the mobile robot 100 and the obstacle.

The ID sensor 170 is provided, for example, near the display unit 150. The ID sensor 170 identifies the ID of the user who operates the mobile robot 100, and detects a unique identifier included in the ID card owned by each user. The ID sensor 170 includes, for example, an antenna for reading information on a wireless tag. The user brings the ID card close to the ID sensor 170 such that the mobile robot 100 is caused to recognize the ID of the user who is the operator.

The control unit 180 is an information processing device including an arithmetic device such as a central processing unit (CPU). The control unit 180 includes hardware (an example of a storage medium) provided in the control unit 180 and a program stored in the hardware. That is, processes executed by the control unit 180 are realized by either hardware or software.

The control unit 180 acquires various types of information from each configuration and issues a command to each configuration in accordance with the acquired information. For example, the control unit 180 detects the distance between the mobile robot 100 and the surrounding object from the image data acquired from the robot camera 161 and the information on the object around the mobile robot 100 acquired from the distance sensor 162. Then, the control unit 180 commands the drive unit 110 to move along the calculated route. When executing such a process, the control unit 180 refers to information related to a floor map stored in the storage unit 190.

The storage unit 190 includes a non-volatile memory such as a flash memory and a solid state drive (SSD). The storage unit 190 stores the floor map of the facility used by the mobile robot 100 for autonomous movement. Further, the storage unit 190 stores the priority information of the mobile robot 100. The storage unit 190 also stores the flag information associated with the mobile robot 100 and the standby area. The storage unit 190 is connected to the control unit 180, and outputs stored information to the control unit 180 in response to a request from the control unit 180.

As shown in FIG. 2, the mobile robot 100 has the +X-axis direction side on which the robot camera 161 is installed as the front. That is, during normal movement, the traveling direction is the +X-axis direction as shown by the arrow.

Various ideas can be adopted for how to define the front of the mobile robot 100. For example, the front can be defined based on how the sensor group 160 for recognizing the surrounding environment is disposed. Specifically, the +X-axis direction side of the housing unit 120 on which the sensor having high recognition ability is disposed or many sensors are disposed can be set as the front. By defining the front as described above, the mobile robot 100 can move while recognizing the surrounding environment more accurately. The mobile robot 100 according to the present embodiment also has the +X-axis direction side on which the robot camera 161 is disposed as the front.

Alternatively, the front can be defined based on how the display unit 150 is disposed. When the display unit 150 displays the face of the character or the like, the surrounding people naturally recognize that the display unit 150 is the front of the mobile robot 100. Therefore, when the display surface side of the display unit 150 is set as the front, there is little discomfort to the surrounding people. The mobile robot 100 according to the present embodiment also has the display surface side of the display unit 150 as the front.

Further, the front may be defined based on a shape of the housing of the mobile robot 100. For example, when the projected shape of the housing unit 120 on the traveling surface is rectangular, it is better to have the short side as the front than the longitudinal side as the front, whereby people who pass by the mobile robot 100 are not obstructed during moving. That is, depending on the shape of the housing, there is a housing surface that is preferably set as the front when the mobile robot 100 moves normally. The mobile robot 100 according to the present embodiment also has the short side of the rectangular shape as the front. As described above, for the mobile robot 100, the front is defined so as to match some ideas. However, the idea used to define the front may be determined in consideration of the shape and role of the mobile robot.

Operation of Mobile Robot

Next, the operation of the mobile robot according to the present embodiment will be described. For example, the user turns on the power supply of the mobile robot 100. Then, the user inputs a desired task to the operation reception unit 140. When necessary, the ID sensor 170 identifies the ID of the user when the power supply is turned on or when the user operates the operation reception unit 140.

In order to transport the transported object as a desired task, the user operates the operation reception unit 140 to open the storage chamber door 121 and store the transported object in the storage chamber. Then, the user operates the operation reception unit 140 to close the storage chamber door 121. When the transported object stored in the storage chamber is a clean transported object, the user associates the mobile robot 100 with the cleanliness flag. Alternatively, the user stores a clean transported object in the mobile robot 100 associated with the cleanliness flag. For example, the user operates the operation reception unit 140 to associate the mobile robot 100 with the cleanliness flag.

Here, clean transported objects are, for example, a drug taken by the human body, blood for blood transfusion, food, etc., an unused syringe, an unused injection needle, clothing, etc. that come into contact with the human body. On the other hand, unclean transported objects are garbage and the like that are disposed of. Further, general-purpose transported objects are stationery, copy papers, and the like.

When the transported object stored in the storage chamber is the unclean transported object, the user associates the mobile robot 100 with the uncleanliness flag. Alternatively, the user stores the unclean transported object in the mobile robot 100 associated with the uncleanliness flag. For example, the user operates the operation reception unit 140 to associate the mobile robot 100 with the uncleanliness flag.

Further, when the transported object stored in the storage chamber is the general-purpose transported object, the user associates the mobile robot 100 with the general-purpose flag. Alternatively, the user stores the general-purpose transported object in the mobile robot 100 associated with the general-purpose flag. For example, the user operates the operation reception unit 140 to associate the mobile robot 100 with the general-purpose flag.

The association of the cleanliness flag, the uncleanliness flag, and the general-purpose flag is not limited to the operation of the operation reception unit 140 by the user. The mobile robot 100 may determine whether the transported object is clean, unclean, or for general purposes using the sensor group 160 and associate the transported object with the corresponding flag. Further, the mobile robot 100 may be associated with the flag based on the flag information transmitted from the server device 300.

Further, the mobile robot 100 is not always associated with any of the cleanliness flag, the uncleanliness flag, and the general-purpose flag. There may be a mobile robot 100 that is not associated with the flag.

Next, the user inputs the destination to which the transported object is delivered using the operation reception unit 140. The control unit 180 of the mobile robot 100 may search for a route to the destination using the floor map stored in the storage unit 190. The mobile robot 100 autonomously moves along the searched route.

FIG. 4 is a plan view illustrating a movement method of the mobile robot 100 in the facility 900 according to the first embodiment. As shown in FIG. 4, the facility 900 is provided with an aisle 902 extending in the X-axis direction. A destination 908 is provided at a predetermined position in the aisle 902. The mobile robot 100 performs the work at the destination 908. The work at the destination 908 is, for example, the delivery of the transported object. A waypoint 909 may be provided at the predetermined position of the aisle 902 instead of the destination 908. The mobile robot 100 moves by passing through the waypoint 909. The destination 908 and the waypoint 909 are not limited to being provided in the aisle 902, but may be provided in a room, a hall, or the like as long as the facility 900 is used. Further, in the following description, the delivery of the transported object will be described as the work at the destination 908, using the destination 908 as an example.

A standby area 930 is provided in the vicinity of the destination 908. The standby area 930 is preferably provided in the aisle 902 so as not to interfere with the movement of people and other mobile robots 100. The standby area 930 has a plurality of standby positions 931 to 933. In the figure, three standby positions 931 to 933 are shown, but the number of the plurality of standby positions 931 to 933 is not limited to three, and may be two or four or more. The standby positions 931 to 933 are places where the mobile robot 100 stops and stands by.

A plurality of mobile robots 100A to 100C delivers the transported objects to the destination 908. In the figure, three mobile robots 100A to 100C are shown, but the number of the plurality of mobile robots 100A to 100C is not limited to three, and may be two or four or more.

The plurality of mobile robots 100A to 100C are prioritized for the delivery at the destination 908 in the facility 900. For example, the mobile robot 100A has the first priority, the mobile robot 100B has the second priority, and the mobile robot 100C has the third priority. Therefore, the mobile robot 100A delivers the transported object at the destination 908 before the mobile robots 100B and 100C.

The mobile robot 100B delivers the transported object at the destination 908 after the mobile robot 100A and before the mobile robot 100C.

As described above, among the priorities assigned to the plurality of mobile robots 100A to 100C for the work at the destination 908 in the facility 900, the mobile robots 100B and 100C with lower priorities stand by in the predetermined standby area 930 until the robot 100A with a higher priority completes the work. For example, when the mobile robot 100A having the first priority is delivering the transported object, the mobile robots 100B and 100C having lower priorities stand by in the standby area 930 until the mobile robot 100A completes the delivery.

Further, when the mobile robots 100B and 100C having lower priorities arrive at the destination 908 before the mobile robot 100A having a higher priority, the mobile robots 100B and 100C may stand by in the standby area 930 until the mobile robot 100A having a higher priority arrives at the destination 908 and completes the delivery of the transported object.

The standby area 930 may have a plurality of standby positions 931 to 933 prioritized according to the distance from the destination 908. For example, the standby position 931 is closer to the destination 908 than the standby positions 932 and 932 are. The standby position 932 is closer to the destination 908 than the standby position 933 is. Therefore, the standby position 931 has the first priority, the standby position 932 has the second priority, and the standby position 933 has the third priority.

Among the plurality of mobile robots 100B and 100C standing by in the standby area 930, the mobile robot 100B having a higher priority stands by at the standby position 931 having a higher priority. The mobile robot 100C having a lower priority than the mobile robot 100B stands by at the standby position 932 having a lower priority than the standby position 931 at which the mobile robot 100B stands by. Therefore, the standby positions 931 to 933 are used from the standby position 931 having a higher priority.

Figure 5:
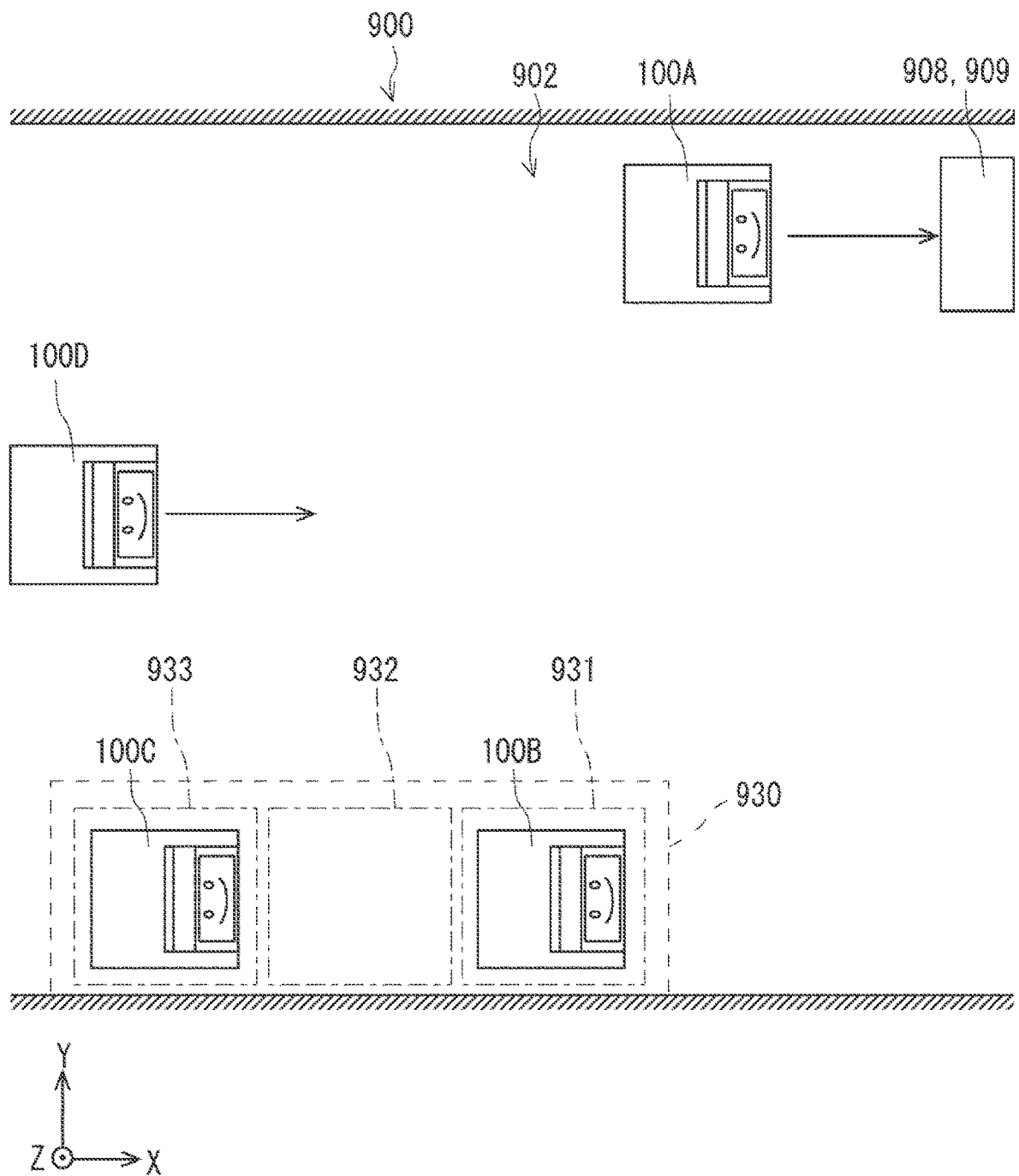
FIG. 5 is a plan view illustrating a movement method of the mobile robot in the facility according to the first embodiment, and shows an example in which the mobile robot having a higher priority cuts into a standby position having a higher priority than a standby position of the mobile robot having a lower priority.

FIG. 5 is a plan view illustrating a movement method of moving the mobile robot 100 in the facility 900 according to the first embodiment, and shows an example in which a mobile robot 100D having a higher priority cuts into a standby position having a higher priority than the standby position of the mobile robot 100C having a lower priority. As shown in FIG. 5, the mobile robot 100D arrives at the standby area 930. The priority of the mobile robot 100D is lower than that of the mobile robot 100B and higher than that of the mobile robot 100C. In this case, the mobile robot 100C leaves the standby position 932 and moves to the standby position 933. The mobile robot 100D stands by at the vacant standby position 932.

In this way, the mobile robot 100D having a higher priority than the mobile robot 100C standing by at the standby position 932 causes the mobile robot 100C to move to the standby position 933 having a lower priority when the mobile robot 100D arrives at the standby area 930. Then, the mobile robot 100D cuts into the standby position 932 having a higher priority than the standby position 933 at which the mobile robot 100C stands by. This makes it possible for the mobile robot 100D to stand by at the standby position 932 having a higher priority than the standby position 933 at which the mobile robot 100C stands by. Therefore, the mobile robot 100D can stand by at the standby position 932 according to the priority, and can smoothly proceed with the delivery and the like at the destination 908.

FIG. 6 is a plan view illustrating a movement method of the mobile robot 100 in the facility 900 according to the first embodiment, and shows an example in which the mobile robot 100 reserves the standby position 932 when moving toward the standby area 930. The mobile robots 100B and 100C stand by in the standby area 930. The mobile robot 100D moves toward the standby area 930 by, for example, an elevator or the like. The priority of the mobile robot 100D is lower than that of the mobile robot 100B and higher than that of the mobile robot 100C. The mobile robot 100D notifies the mobile robots 100B and 100C standing by in the standby area 930 that the mobile robot 100D will stand by in the standby area 930. In this case, as shown in FIG. 6, the mobile robot 100C having a lower priority leaves the standby position 932 and moves to the standby position 933. Thus, the mobile robot 100D reserves the standby position 932.

As described above, the mobile robot 100D having a higher priority than the mobile robot 100C standing by in the standby area 930 reserves, when moving toward the standby area 930, the standby position 932 having a higher priority than the standby position 933 at which the mobile robot 100C stands by. After that, the mobile robot 100D that has arrived at the standby area 930 stands by at the reserved standby position 932. As a result, the mobile robot 100D moving toward the standby area 930 can reserve the standby position 932 according to the priority, and can smoothly proceed with the delivery and the like at the destination 908.

The mobile robots 100B to 100D standing by in the standby area 930 perform delivery at the destination 908 after the mobile robot 100A having a higher priority completes the delivery at the destination 908. In that case, some work may occur by the administrator of the mobile robots 100, such as receiving the transported objects (or opening/closing the gate of the waypoint 909). Therefore, it is preferable to notify the administrator in advance of standby information including information such as the number of the mobile robots 100 standing by in the standby area 930, the standby time, and the work that occurs.

However, if all the mobile robots 100 standing by in the standby area 930 notify the administrator individually, the administration may become complicated. Therefore, the mobile robot 100B standing by at the standby position 931 having the highest priority notifies the administrator of the standby information including the standby information of the mobile robots 100C and 100D standing by at positions other than the standby position 931 having the highest priority. As a result, the administrator can receive the standby information in advance, prepare for the work at the destination 908, reduce the amount of notifications received, and reduce the burden.

Figure 7:
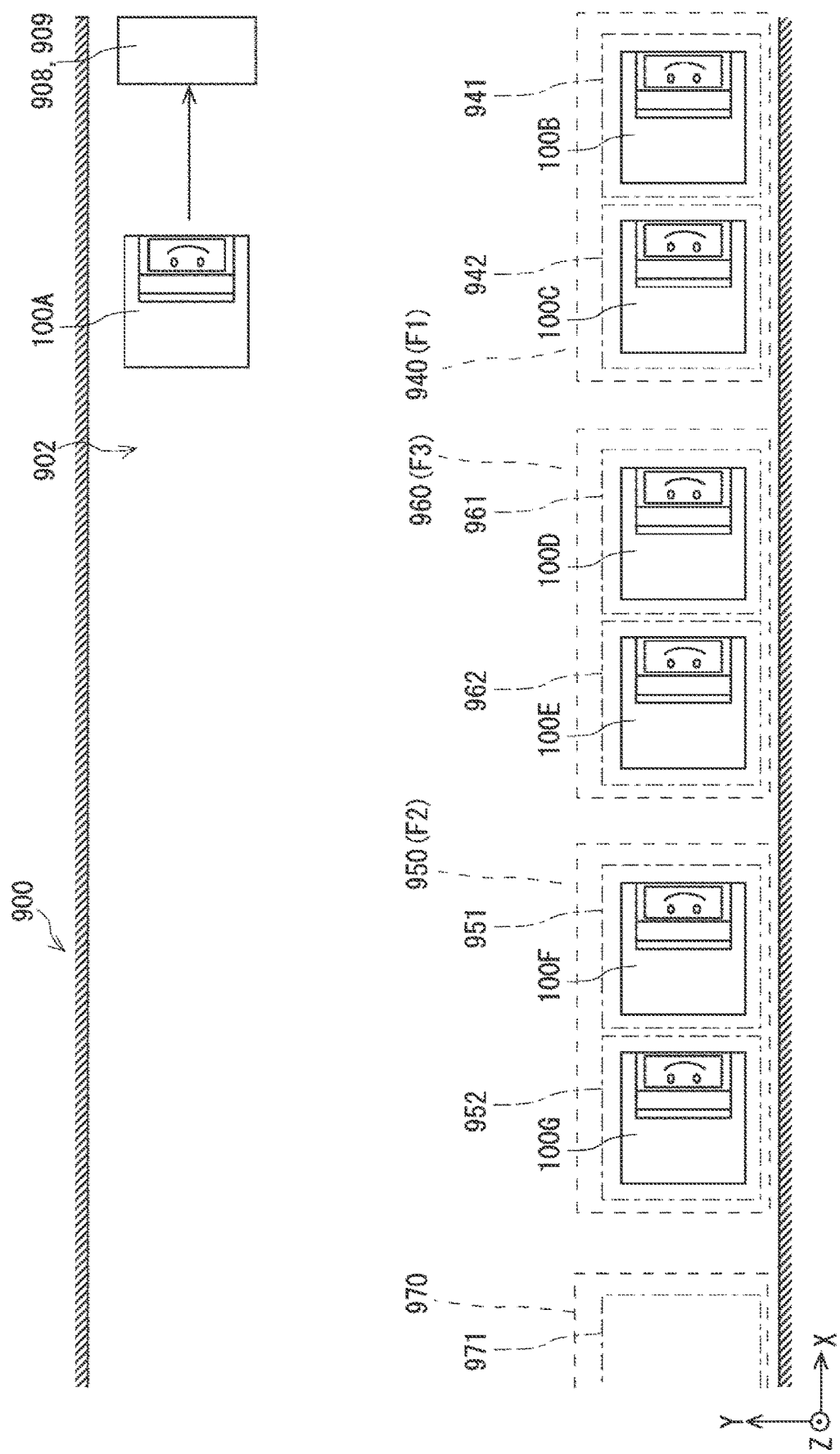
FIG. 7 is a plan view illustrating a movement method of the mobile robot in the facility according to the first embodiment, and shows an example in which the mobile robots and the standby areas have flag information.

FIG. 7 is a plan view illustrating a movement method of the mobile robot 100 in the facility 900 according to the first embodiment, and shows an example in which the mobile robot 100 and the standby area 930 have the flag information. As shown in FIG. 7, the facility 900 may be provided with a plurality of standby areas 940, 950, 960, and 970. The standby area 940 includes standby positions 941 and 942. The standby area 950 includes standby positions 951 and 952. The standby area 960 includes standby positions 961 and 962. The standby area 970 includes a standby position 971. The standby areas 940, 950, 960, and 970 are collectively referred to as the standby area 930.

For example, the standby area 940 is set as the clean area associated with a cleanliness flag F1. The standby area 950 is set as the unclean area associated with an uncleanliness flag F2. The standby area 960 is set as the general-purpose area associated with a general-purpose flag F3. As described above, the facility 900 may be provided with the standby area 940 set as the clean area, the standby area 950 set as the unclean area, and the standby area 960 set as the general-purpose area. Further, the facility 900 may include the standby area 970 that is not associated with the flag.

The mobile robots 100B and 100C associated with the cleanliness flag F1 are allowed to enter the standby area 940 associated with the cleanliness flag F1, but are prohibited from entering the standby area 950 associated with the uncleanliness flag F2. The mobile robots 100B and 100C may be allowed to enter the standby area 960 or may be allowed to enter the standby area 970.

The mobile robots 100F and 100G associated with the uncleanliness flag F2 are allowed to enter the standby area 950 associated with the uncleanliness flag F2, but are prohibited from entering the standby area 940 associated with the cleanliness flag F1. The mobile robots 100F and 100G may be allowed to enter the standby area 960 or may be allowed to enter the standby area 970.

The mobile robots 100D and 100E associated with the general-purpose flag F3 are allowed to enter the standby area 960 associated with the general-purpose flag F3. The mobile robots 100D and 100E may be allowed to enter the standby areas 940 and 950. Further, the mobile robots 100D and 100E may be allowed to enter the standby area 970.

When the mobile robot 100 is associated with the cleanliness flag F1, the mobile robot 100 is prohibited from standing by in the same standby area 930 as the other mobile robots 100 associated with the uncleanliness flag F2. For example, when the mobile robot 100B associated with the cleanliness flag F1 is standing by in the standby areas 960 and 970, the mobile robot 100F associated with the uncleanliness flag F2 is prohibited from standing by in the same standby areas 960 and 970. When the mobile robot 100F associated with the uncleanliness flag F2 is standing by in the standby areas 960 and 970, the mobile robot 100B associated with the cleanliness flag F1 is prohibited from standing by in the same standby areas 960 and 970.

The standby areas 960 and 970 where the mobile robot 100B associated with the cleanliness flag F1 has stood by are designated as the clean areas for a predetermined period. Therefore, the mobile robot 100F associated with the uncleanliness flag F2 cannot stand by in the standby areas 960 and 970 for the predetermined period. The standby areas 960 and 970 where the mobile robot 100F associated with the uncleanliness flag F2 has stood by are designated as the unclean areas for a predetermined period. Therefore, the mobile robot 100B associated with the cleanliness flag F1 cannot stand by in the standby areas 960 and 970 for the predetermined period.

Further, the standby areas 960 and 970 may be set as the clean areas for a predetermined time, and may be set as the unclean areas for a predetermined time thereafter.

When the mobile robot 100B is associated with the cleanliness flag F1, the mobile robot 100B moves away from the mobile robot 100F associated with the uncleanliness flag F2 by a predetermined distance or more. Similarly, when the mobile robot 100F is associated with the uncleanliness flag F2, the mobile robot 100F moves away from the mobile robot 100B associated with the cleanliness flag F1 by a predetermined distance or more. With this configuration, cleanliness can be maintained.

As described above, the plurality of the mobile robots 100 includes the mobile robots 100 associated with the cleanliness flag F1 or the uncleanliness flag F2. The plurality of the standby areas 930 includes the standby areas 930 associated with the cleanliness flag F1 or the uncleanliness flag F2. The mobile robot 100B associated with the cleanliness flag F1 stands by at the standby positions 941 and 942 of the standby area 940 associated with the cleanliness flag F1. The mobile robot 100F associated with the uncleanliness flag F2 stands by at the standby positions 951 and 952 of the standby area 950 associated with the uncleanliness flag F2. Between the standby area 940 associated with the cleanliness flag F1 and the standby area 950 associated with the uncleanliness flag F2, the standby area 960 associated with a flag different from the cleanliness flag F1 and the uncleanliness flag F2, for example, the general-purpose flag F3 may be provided. As a result, the cleanliness of the standby area 930 associated with the cleanliness flag F1 can be maintained.

Figure 8:
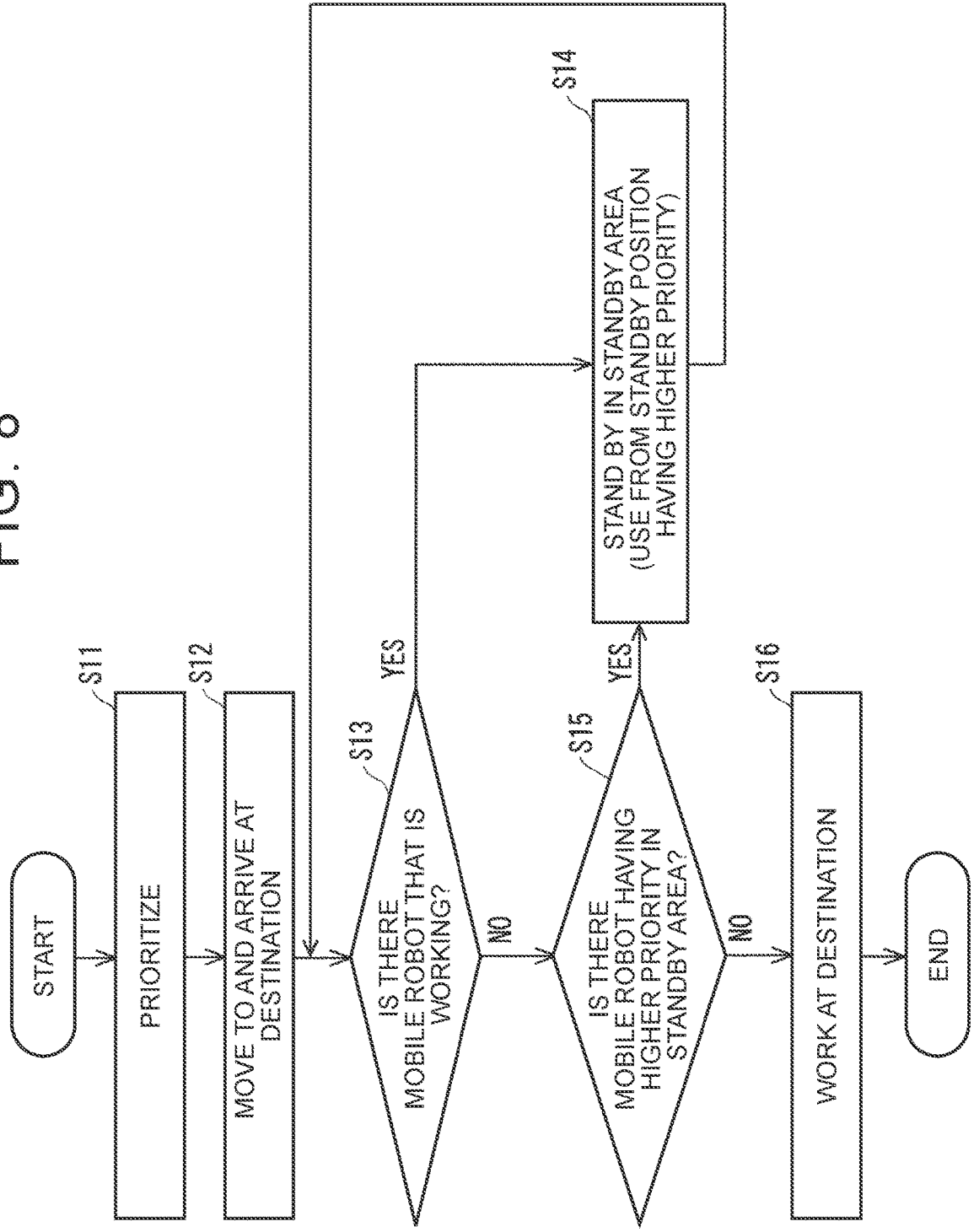
FIG. 8 is a flowchart illustrating an autonomous mobile method for the mobile robot in the facility according to the first embodiment.

The operation of the mobile robot 100 described above will be described with reference to a flowchart. FIG. 8 is a flowchart illustrating an autonomous mobile method for the mobile robot in the facility 900 according to the first embodiment.

As shown in step S11 of FIG. 8, the mobile robots 100 are prioritized. Specifically, the mobile robots 100 are prioritized by any one of the priorities assigned to the plurality of the mobile robots 100 for the work at the destination 908 in the facility 900 or the passage through the waypoint 909. The mobile robots 100 may be prioritized when moving toward the destination 908, or may be prioritized in advance.

Next, as shown in step S12, the mobile robot 100 moves to the destination 908 and arrives at the destination 908. For example, the mobile robot 100 moves to the destination 908 based on the searched route.

Next, as shown in step S13, the mobile robot 100 that has arrived at the destination 908 determines whether there is a mobile robot 100 working at the destination 908. The work at the destination 908 is, for example, the delivery of the transported object. In step S13, for example, when there is a mobile robot 100A that is working, the mobile robots 100B and 100C stand by in the standby area 930 as shown in step S14. That is, when the mobile robots 100B and 100C have lower priorities, the mobile robots 100B and 100C stand by in the standby area 930 until the other mobile robot 100A having a higher priority completes the work.

At the time of standby, in the standby area 930, the mobile robot 100B having a higher priority uses the standby position for standby from the standby position 931 having a higher priority. Then, the process returns to step S13. That is, it is determined whether there is a mobile robot 100A that is working. When there is a mobile robot 100A that is working, the mobile robot 100B stands by in the standby area 930.

On the other hand, in step S13, when there is no mobile robot 100A that is working, as shown in step S15, it is determined whether there is a mobile robot 100 having a higher priority in the standby area 930. For example, the mobile robot 100C determines whether a mobile robot 100B having a higher priority is present in the standby area 930. In step S15, when there is a mobile robot 100B having a higher priority in the standby area 930, the mobile robot 100C stands by in the standby area 930 as shown in step S14.

At the time of standby, in the standby area 930, the mobile robot 100 having a higher priority uses the standby position from the standby position 931 having a higher priority. For example, when the mobile robot 100B having a higher priority and standing by at the standby position 931 having a higher priority shifts to the work at the destination 908 and the standby position 931 having a higher priority becomes vacant, the mobile robot 100C whose priority has become higher moves to the vacant standby position 931 and stands by. After that, the process returns to step S13, and repeats step S14 or step S15.

In step S15, when there is no mobile robot 100 having a higher priority in the standby area 930, the mobile robot 100C performs the work at the destination 908 as shown in step S16. That is, the mobile robot 100C leaves the standby area 930 and starts the work at the destination 908. In this way, the mobile robot 100 can perform the work at the destination 908 according to the priority.

At the time of standby, the mobile robot 100D having a higher priority than the mobile robot 100C standing by in the standby area 930 may reserve, when moving toward the standby area 930, the standby position 932 having a higher priority than the standby position 933 at which the mobile robot 100C stands by. Further, the mobile robot 100D having a higher priority than the mobile robot 100C standing by in the standby area 930 may cut into, when arriving at the standby area 930, the standby position 932 having a higher priority than the standby position 933 at which the mobile robot 100C stands by.

In addition, the mobile robots 100B and 100C associated with the cleanliness flag F1 may stand by at the standby positions 941 and 942 of the standby area 940 associated with the cleanliness flag F1. The mobile robots 100F and 100G associated with the uncleanliness flag F2 may stand by at the standby positions 951 and 952 of the standby area 950 associated with the uncleanliness flag F2.

Next, the effect of the present embodiment will be described. When the priority for the delivery or the like to the destination 908 is lower, the mobile robot 100 of the present embodiment stands by in the standby area 930 or the like even when the mobile robot 100 arrives at the destination 908 prior to other mobile robots 100. As a result, it is possible to perform the delivery from the succeeding mobile robot 100 having a higher priority. Therefore, an efficient delivery schedule can be created and the movement efficiency can be improved.

The standby positions 931 to 933 and the like are prioritized according to the distance from the destination 908 and the like. Therefore, the mobile robot 100 on standby can shorten the time for moving from the standby area 930 to the destination 908 or the like when the turn comes, and an efficient delivery schedule can be created. Further, the mobile robot 100 can reserve the standby positions 931 to 933 and the like when moving toward the standby area 930. Therefore, it is possible to stand by at the standby positions 931 to 933 and the like immediately after arriving at the standby area 930, so that the standby time can be shortened.

The mobile robot 100, the standby area 930, and the like may be associated with the cleanliness flag F1 and the like. Thereby, the cleanliness of the mobile robot 100 and the standby area 930 can be improved.

Second Embodiment

Next, an autonomous mobile system according to a second embodiment will be described. The autonomous mobile system according to the present embodiment is a system that controls an autonomous mobile device that autonomously moves in the predetermined facility 900. The autonomous mobile system will be described separately in "Configuration of Autonomous Mobile System" and "Operation of Autonomous Mobile System".

Configuration of Autonomous Mobile System

The autonomous mobile system includes the mobile robot 100. The autonomous mobile system may include a plurality of the mobile robots 100. Further, the autonomous mobile system may include the server device 300 and the facility camera 400 in addition to the mobile robot 100.

Mobile Robot

The configuration of the mobile robot 100 according to the present embodiment is the same as that of the above-described first embodiment. The mobile robot 100 according to the present embodiment may cause the server device 300 to execute some of the functions of the mobile robot 100 according to the first embodiment.

For example, the server device 300 may be caused to prioritize a plurality of the mobile robots 100 for the delivery at the destination 908 or the passage through the waypoint 909 in the facility 900. For example, the server device 300 may be caused to execute association of the mobile robots 100 with the cleanliness flag, the uncleanliness flag, and the general-purpose flag. Further, the server device 300 may be caused to execute association of the standby area 930 in the facility 900 with the cleanliness flag F1, the uncleanliness flag F2, and the general-purpose flag F3.

Server Device

The server device 300 is, for example, a computer having a communication function. The server device 300 may be installed at any place as long as the server device 300 can communicate with each configuration of the autonomous mobile system. The server device 300 transmits and receives traveling information to and from the plurality of the mobile robots 100.

Figure 9:
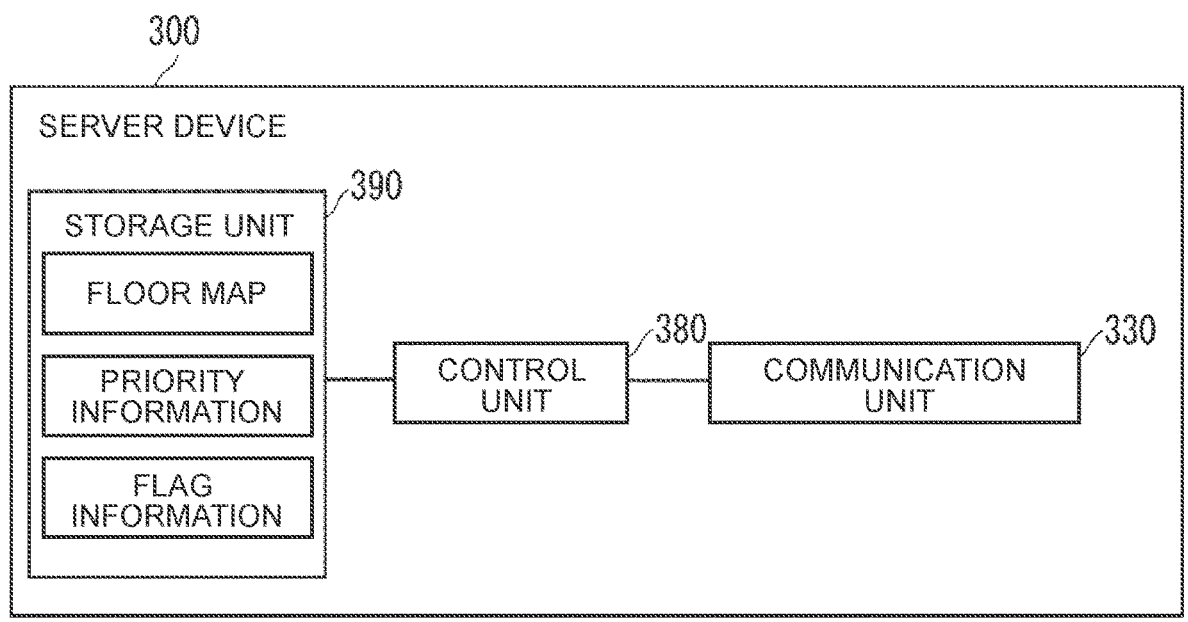
FIG. 9 is a block diagram illustrating a server device according to a second embodiment.

FIG. 9 is a block diagram illustrating the server device 300 according to the second embodiment. As shown in FIG. 9, the server device 300 includes a communication unit 330, a control unit 380, and a storage unit 390.

The communication unit 330 communicates with the mobile robot 100 individually. The communication unit 330 outputs a signal received from each configuration to the control unit 380. Further, the communication unit 330 appropriately transmits a signal output from the control unit 380 to each configuration. The communication unit 330 may include a router device for performing communication between the server device 300 and a plurality of configurations. The communication unit 330 may have a plurality of communication means different for each component to communicate with each other in order to communicate with the server device 300 and the configurations. The communication unit 330 may be communicably connected to each configuration via an intranet line or the Internet line. The communication unit 330 may transmit and receive the priority information and the flag information to and from the mobile robot 100. Further, the communication unit 330 may receive the image data of the destination 908 and the standby area 930 from the facility camera 400.

The control unit 380 is configured by an arithmetic device such as a CPU and executes various types of information processing. The control unit 380 may prioritize each mobile robot 100 for the work at the destination 908 or the passage through the waypoint 909 in the facility 900. The control unit 380 may associate the mobile robots 100 and the standby areas 930 with the cleanliness flag, the uncleanliness flag, and the general-purpose flag. Further, the control unit 380 extracts standby area information including information such as the number of the mobile robots 100 on standby, the standby time, and the vacancy of the standby positions from the image data of the destination 908 and the standby area 930.

The storage unit 390 includes a non-volatile memory such as a flash memory and an SSD. The storage unit 390 stores the floor map of the facility used by the mobile robot 100 for autonomous movement. Further, the storage unit 390 stores the priority information of the mobile robot 100. The storage unit 390 also stores the flag information of the mobile robot 100 and the standby area 930. The storage unit 390 is connected to the control unit 380, and outputs stored information to the control unit 380 in response to a request from the control unit 380.

Operation of Autonomous Mobile System

Next, the operation of the autonomous mobile system will be described. FIG. 10 is a sequence diagram illustrating the operation of the autonomous mobile system according to the second embodiment.

As shown in step S201 of FIG. 10, the server device 300 prioritizes the plurality of the mobile robots 100 for the work at the destination 908 or the passage through the waypoint 909 in the facility 900. Further, as shown in step S202, the server device 300 associates the plurality of the mobile robots 100 and the plurality of the standby areas 930 with the flags F1 to F3.

As shown in step S203, the facility camera 400 may capture images of the destination 908 and the standby area 930 and transmit the image data to the server device 300 as shown in step S204. The server device 300 receives the image data, and as shown in step S205, extracts the standby area information including information such as the number of the mobile robots 100 on standby in the standby area 930, the standby time, and the vacancy of the standby positions.

Next, as shown in step S206, the server device 300 transmits the priority information, the flag information, and the standby area information to the mobile robot 100. Upon receiving these types of information, the mobile robot 100 moves to the destination 908 or the like and arrives at the destination 908 or the like as shown in step S207.

Next, as shown in step S208, the mobile robot 100 determines whether there is a mobile robot 100 working at the destination 908. Further, as shown in step S209, it is determined whether there is a mobile robot 100 having a higher priority in the standby area 930. When there is a mobile robot 100 that is working or when there is a mobile robot 100 having a higher priority in the standby area 930, the mobile robot 100 stands by in the standby area 930 as shown in step S210. At that time, the plurality of the standby positions 931 to 933 prioritized according to the distance from the destination 908 is used for standby from the standby positions 931 to 933 having the higher priority.

In step S208, when there is no mobile robot 100 that is working, and in step S209, when there is no mobile robot 100 having a higher priority in the standby area 930, the mobile robot 100 performs the work at the destination 908. In this way, the mobile robot 100 in the autonomous mobile system can perform the work at the destination 908, for example, deliver the transported object at the destination 908.

According to the present embodiment, the server device 300 can prioritize the plurality of the mobile robots 100. Further, the server device 300 can associate the mobile robot 100 and the standby area 930 with the flags F1 to F3. Therefore, the load on the mobile robot 100 can be reduced, and the processing speed of the mobile robot 100 can also be improved.

Since the server device 300 can centrally control the operation of the plurality of the mobile robots 100, the operation of each mobile robot 100 can be adjusted, and the movement efficiency of the entire system can be improved. Other configurations, operations, and effects are included in the description of the first embodiment.

The present disclosure is not limited to the above embodiments, and can be appropriately modified without departing from the spirit. For example, a combination of the configurations of the first and second embodiments is also included in the scope of the technical idea of the present embodiment. In addition, the autonomous mobile method, the autonomous mobile program, and a storage medium storing the autonomous mobile program described below are also included in the scope of the technical idea of the present embodiment.

Appendix 1

An autonomous mobile method for an autonomous mobile device that autonomously moves in a facility, the autonomous mobile method comprising:
 a step of assigning one of priorities to the autonomous mobile device among the priorities assigned to a plurality of the autonomous mobile devices for work at a destination or passage through a waypoint in the facility; and
 a step of causing, when the autonomous mobile device has a lower priority, the autonomous mobile device to stand by in a predetermined standby area until another autonomous mobile device having a higher priority completes the work or the passage.

Appendix 2

The autonomous mobile method according to Appendix 1, wherein:
 the standby area has a plurality of standby positions prioritized according to a distance from the destination or the waypoint; and
 in the step of causing the autonomous mobile device to stand by in the predetermined standby area, the standby area is used for standby from the standby position having a higher priority.

Appendix 3

The autonomous mobile method according to Appendix 2, wherein in the step of causing the autonomous mobile device to stand by in the predetermined standby area, when the autonomous mobile device has a higher priority than another autonomous mobile device standing by in the standby area, the autonomous mobile device reserves, when moving toward the standby area, the standby position having a higher priority than the standby position at which the other autonomous mobile device stands by.

Appendix 4

The autonomous mobile method according to Appendix 2, wherein in the step of causing the autonomous mobile device to stand by in the predetermined standby area, when the autonomous mobile device has a higher priority than another autonomous mobile device standing by in the standby area, the autonomous mobile device cuts into, when arriving at the standby area, the standby position having a higher priority than the standby position at which the other autonomous mobile device stands by.

Appendix 5

The autonomous mobile method according to Appendix 3 or 4, wherein when standing by at the standby position having the highest priority, the autonomous mobile device notifies an administrator of the autonomous mobile device of standby information including the standby information of the autonomous mobile device standing by at the standby position other than the standby position having the highest priority.

Appendix 6

The autonomous mobile method according to any one of Appendices 2 to 5, wherein:
 the autonomous mobile devices include the autonomous mobile device associated with a cleanliness flag or an uncleanliness flag;
 a plurality of the standby areas is provided in the facility;

the standby areas include the standby area associated with the cleanliness flag or the uncleanliness flag; and in the step of causing the autonomous mobile device to stand by in the predetermined standby area, when associated with the cleanliness flag, the autonomous mobile device stands by at the standby position in the standby area associated with the cleanliness flag, and when associated with the uncleanliness flag, the autonomous mobile device stands by at the standby position in the standby area associated with the uncleanliness flag.

Appendix 7

The autonomous mobile method according to Appendix 6, wherein the standby area associated with a flag different from the cleanliness flag and the uncleanliness flag is provided between the standby area associated with the cleanliness flag and the standby area associated with the uncleanliness flag.

Appendix 8

An autonomous mobile program for an autonomous mobile device that autonomously moves in a facility, the autonomous mobile program causing a computer to execute:

assignment of one of priorities to the autonomous mobile device among the priorities assigned to a plurality of the autonomous mobile devices for work at a destination or passage through a waypoint in the facility; and standby of the autonomous mobile device, when the autonomous mobile device has a lower priority, in a predetermined standby area until another autonomous mobile system having a higher priority completes the work or the passage.

Appendix 9

The autonomous mobile program according to Appendix 8, wherein:

the standby area has a plurality of standby positions prioritized according to a distance from the destination or the waypoint; and when causing the autonomous mobile device to stand by in the predetermined standby area, the standby area is used for standby from the standby position having a higher priority.

Appendix 10

The autonomous mobile program according to Appendix 9, causing the computer to execute, in causing the autonomous mobile device to stand by in the predetermined standby area, reservation of the standby position having a higher priority than the standby position at which another autonomous mobile device stands by, when the autonomous mobile device has a higher priority than the other autonomous mobile device standing by in the standby area, and when the autonomous mobile device moves toward the standby area.

Appendix 11

The autonomous mobile program according to Appendix 9, causing the computer to execute, in causing the autonomous mobile device to stand by in the predetermined standby area, cut-in into the standby position having a higher priority than the standby position at which another autonomous mobile device stands by, when the autonomous mobile device has a higher priority than the other autonomous mobile device standing by in the standby area, and when the autonomous mobile device arrives at the standby area.

Appendix 12

The autonomous mobile program according to Appendix 10 or 11, causing the computer to execute notification of standby information including the standby information of the autonomous mobile device standing by at the standby position other than the standby position having the highest priority to an administrator of the autonomous mobile device, when the autonomous mobile device stands by at the standby position having the highest priority.

Appendix 13

The autonomous mobile program according to any one of Appendices 9 to 12, wherein:

the autonomous mobile devices include the autonomous mobile device associated with a cleanliness flag or an uncleanliness flag;

a plurality of the standby areas is provided in the facility;

the standby areas include the standby area associated with the cleanliness flag or the uncleanliness flag; and in causing the autonomous mobile device to stand by in the predetermined standby area, the autonomous mobile program causes the computer to execute: standby of the autonomous mobile device at the standby position in the standby area associated with the cleanliness flag when the autonomous mobile device is associated with the cleanliness flag; and standby of the autonomous mobile device at the standby position in the standby area associated with the uncleanliness flag when the autonomous mobile device is associated with the uncleanliness flag.

Appendix 14

The autonomous mobile program according to Appendix 13, wherein the standby area associated with a flag different from the cleanliness flag and the uncleanliness flag is provided between the standby area associated with the cleanliness flag and the standby area associated with the uncleanliness flag.

What is claimed is:

1. An autonomous mobile system comprising:

a plurality of autonomous mobile robots including an autonomous mobile robot that autonomously moves in a facility, wherein among priorities assigned to the plurality of the autonomous mobile robots for delivery of a transported object at a destination or passage through a waypoint in the facility, when the autonomous mobile robot has a lower priority, the autonomous mobile robot stands by in a predetermined standby area until another autonomous mobile robot having a higher priority than the autonomous mobile robot completes the delivery or the passage;

wherein the priority of each of the autonomous mobile robots is set based on work comprising transporting the transported object at the destination wherein the predetermined standby area has a plurality of standby positions prioritized according to a distance from the destination or the waypoint, and are used for standby according to priority of the autonomous mobile robots;

wherein when the autonomous mobile robot has a higher priority than a third autonomous mobile robot standing by in the predetermined standby area, the autonomous mobile robot reserves, when moving toward the predetermined standby area, a target standby position having a higher priority than an occupied standby position at which the third autonomous mobile robot stands by:

wherein the plurality of autonomous mobile robots includes at least one autonomous mobile robot associated with a cleanliness flag or an uncleanliness flag;

wherein the predetermined standby area is one of a plurality of predetermined standby areas provided in the facility;

wherein the plurality of predetermined standby areas includes at least one predetermined cleanliness standby area associated with the cleanliness flag or at least one predetermined uncleanliness standby area associated with the uncleanliness flag;

when associated with the cleanliness flag, the autonomous mobile robot stands by at a target cleanliness standby position among the plurality of standby positions in the at least one predetermined cleanliness standby area associated with the cleanliness flag; and when associated with the uncleanliness flag, the autonomous mobile robot stands by at a target uncleanliness standby position among the plurality of standby positions in the at least one predetermined uncleanliness standby area associated with the uncleanliness flag.

2. The autonomous mobile system according to claim 1, wherein when standing by at the standby position having the highest priority, the autonomous mobile robot notifies an administrator of the autonomous mobile system of standby information including standby information of another autonomous mobile robot standing by at a standby position other than the standby position having the highest priority.

3. The autonomous mobile system according to claim 1, wherein when the autonomous mobile robot has a higher priority than the third autonomous mobile robot standing by in the predetermined standby area, the autonomous mobile robot cuts into, when arriving at the predetermined standby area, the target standby position having a higher priority than the occupied standby position at which the third autonomous mobile robot stands by.

4. The autonomous mobile system according to claim 3, wherein when standing by at the standby position having the highest priority, the autonomous mobile robot notifies an administrator of the autonomous mobile system of standby information including standby information of another autonomous mobile robot standing by at a standby position other than the standby position having the highest priority.

5. The autonomous mobile system according to claim 1, wherein the plurality of predetermined standby areas includes at least one predetermined alternate standby area associated with a flag different from the cleanliness flag and the uncleanliness flag, and wherein the at least one predetermined alternate standby area is provided between the at least one predetermined cleanliness standby area associated with the cleanliness flag and the at least one predetermined uncleanliness standby area associated with the uncleanliness flag.

6. The autonomous mobile system according to claim 1, wherein when associated with the cleanliness flag, the autonomous mobile robot moves away from another autonomous mobile robot associated with the uncleanliness flag.

7. The autonomous mobile system according to claim 1, wherein the predetermined standby area is set as the predetermined cleanliness standby area or the predetermined uncleanliness standby area for a predetermined time.

8. An autonomous mobile system comprising:
a plurality of autonomous mobile robots that move autonomously in a facility; and
a server device that transmits and receives traveling information to and from the plurality of autonomous mobile robots, wherein the server device prioritizes each autonomous mobile robot of the plurality of autonomous mobile robots for delivery of a transported object at a destination or passage through a waypoint in the facility; and
an autonomous mobile robot having a lower priority than another autonomous mobile robot stands by in a predetermined standby area until the other autonomous mobile robot having a higher priority than the autonomous mobile robot completes the delivery or the passage;

wherein the priority of each of the autonomous mobile robots is set based on work comprising transporting the transported object at the destination;

wherein the predetermined standby area has a plurality of standby positions prioritized according to a distance from the destination or the waypoint, and are used for standby according to priority;

wherein when the autonomous mobile robot has a higher priority than a third autonomous mobile robot standing by in the predetermined standby area, the autonomous mobile robot reserves, when moving toward the predetermined standby area, a target standby position having a higher priority than an occupied standby position at which the third autonomous mobile robot stands by:

wherein the server device associates the autonomous mobile robot with a cleanliness flag or an uncleanliness flag, associates a target standby position among the plurality of standby positions of the predetermined standby area with the cleanliness flag or the uncleanliness flag;

when the autonomous mobile robot is associated with the cleanliness flag the autonomous mobile robot stands by at the target standby position in the predetermined standby area associated with the cleanliness flag; and when the autonomous mobile robot is associated with the uncleanliness flag the autonomous mobile robot stands by at the target standby position in the predetermined standby area associated with the uncleanliness flag.

9. The autonomous mobile system according to claim 8, wherein the autonomous mobile robot having a higher priority than the third autonomous mobile robot standing by in the predetermined standby area cuts into, when arriving at the predetermined standby area, the target standby position having a higher priority than the occupied standby position at which the third autonomous mobile robot stands by.

10. The autonomous mobile system according to claim 8, wherein the server device collectively notifies an administrator of the autonomous mobile system of standby information of each autonomous mobile robot among the plurality of autonomous mobile robots standing by in the predetermined standby area.

11. The autonomous mobile system according to claim 8, wherein the predetermined standby area includes at least one predetermined alternate standby position among the plurality of standby positions of the predetermined standby area associated with a flag different from the cleanliness flag and the uncleanliness flag, and wherein the at least one predetermined alternate standby position is provided between the target standby position associated with the cleanliness flag and the target standby position associated with the uncleanliness flag.

12. An autonomous mobile method for an autonomous mobile robot that autonomously moves in a facility, the autonomous mobile method comprising:
a step of assigning one of priorities to the autonomous mobile robot among the priorities assigned to a plurality of the autonomous mobile robots for delivery of a transported object at a destination or passage through a waypoint in the facility; and
a step of causing, when the autonomous mobile robot has a lower priority, the autonomous mobile robot to stand by in a predetermined standby area until another autonomous mobile robot having a higher priority than the autonomous mobile robot completes the delivery or the passage;

wherein the priority of each of the autonomous mobile robots is set based on work comprising transporting the transported object at the destination;

wherein the predetermined standby area has a plurality of standby positions prioritized according to a distance from the destination or the waypoint, and are used for standby from the standby position having a higher priority;

wherein when the autonomous mobile robot has a higher priority than another autonomous mobile robot standing by in the predetermined standby area, the autonomous mobile robot reserves, when moving toward the predetermined standby area, a target standby position having a higher priority than an occupied standby position at which the other autonomous mobile robot stands by:

wherein the plurality of autonomous mobile robots includes at least one autonomous mobile robot associated with a cleanliness flag or an uncleanliness flag;

wherein the predetermined standby area is one of a plurality of predetermined standby areas provided in the facility;

wherein the plurality of predetermined standby areas includes at least one predetermined cleanliness standby area associated with the cleanliness flag or at least one predetermined uncleanliness standby area associated with the uncleanliness flag;

when associated with the cleanliness flag, the autonomous mobile robot stands by at a target cleanliness standby position among the plurality of standby positions in the at least one predetermined cleanliness standby area associated with the cleanliness flag; and when associated with the uncleanliness flag, the autonomous mobile robot stands by at a target uncleanliness standby position among the plurality of standby positions in the at least one predetermined uncleanliness standby area associated with the uncleanliness flag.

13. A non-transitory storage medium that stores an autonomous mobile program for an autonomous mobile robot that autonomously moves in a facility, the autonomous mobile program causing a computer to execute:

assignment of one of priorities to the autonomous mobile robot among priorities assigned to a plurality of autonomous mobile robots for delivery of a transported object at a destination or passage through a waypoint in the facility; and standby of the autonomous mobile robot, when the autonomous mobile robot has a lower priority, in a predetermined standby area until another autonomous mobile robot having a higher priority than the autonomous mobile robot completes the delivery or the passage;

wherein the priority of each of the autonomous mobile robots is set based on work comprising transporting the transported object at the destination;

wherein the predetermined standby area has a plurality of standby positions prioritized according to a distance from the destination or the waypoint, and are used for standby from the standby position having a higher priority;

wherein when the autonomous mobile robot has a higher priority than another autonomous mobile robot standing by in the predetermined standby area, the autonomous mobile robot reserves, when moving toward the predetermined standby area, a target standby position having a higher priority than an occupied standby position at which the other autonomous mobile robot stands by;

wherein the plurality of autonomous mobile robots includes at least one autonomous mobile robot associated with a cleanliness flag or an uncleanliness flag;

wherein the predetermined standby area is one of a plurality of predetermined standby areas provided in the facility;

wherein the plurality of predetermined standby areas includes at least one predetermined cleanliness standby area associated with the cleanliness flag or at least one predetermined uncleanliness standby area associated with the uncleanliness flag;

when associated with the cleanliness flag, the autonomous mobile robot stands by at a target cleanliness standby position among the plurality of standby positions in the at least one predetermined cleanliness standby area associated with the cleanliness flag; and when associated with the uncleanliness flag, the autonomous mobile robot stands by at a target uncleanliness standby position among the plurality of standby positions in the at least one predetermined uncleanliness standby area associated with the uncleanliness flag.

* * * * *